US011915661B2

(12) United States Patent
Zhao et al.

(10) Patent No.: US 11,915,661 B2
(45) Date of Patent: Feb. 27, 2024

(54) BACKLIGHT ADJUSTING METHOD OF DISPLAY DEVICE, BACKLIGHT ADJUSTING DEVICE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Chenxi Zhao, Beijing (CN); Xingyu Guo, Beijing (CN); Tiankuo Shi, Beijing (CN); Xiaomang Zhang, Beijing (CN); Xiangjun Peng, Beijing (CN); Shuo Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/909,420

(22) PCT Filed: Jun. 17, 2021

(86) PCT No.: PCT/CN2021/100537
§ 371 (c)(1),
(2) Date: Sep. 5, 2022

(87) PCT Pub. No.: WO2021/259122
PCT Pub. Date: Dec. 30, 2021

(65) Prior Publication Data

US 2023/0094077 A1 Mar. 30, 2023

(30) Foreign Application Priority Data

Jun. 22, 2020 (CN) ........................ 202010573243.X

(51) Int. Cl.
*G09G 3/34* (2006.01)

(52) U.S. Cl.
CPC ..... *G09G 3/342* (2013.01); *G09G 2300/0842* (2013.01); *G09G 2320/0247* (2013.01)

(58) Field of Classification Search
CPC ........... G09G 3/342; G09G 2300/0842; G09G 2320/0247
See application file for complete search history.

(56) References Cited

U.S. PATENT DOCUMENTS 10,163,408 B1 12/2018 Chen et al.
2021/0012727 A1 1/2021 Chang et al.
(Continued)

FOREIGN PATENT DOCUMENTS

CN 101281731 A * 10/2008
CN 101281731 A 10/2008
(Continued)

OTHER PUBLICATIONS

Cn 202010573243.X first office action.
PCT/CN2021/100537 international search report and written opinion.

*Primary Examiner* — Amare Mengistu
*Assistant Examiner* — Jennifer L Zubajlo
(74) *Attorney, Agent, or Firm* — IPro, PLLC

(57) ABSTRACT

A backlight adjusting method of display device, a backlight adjusting device and a display device are provided, where the display device includes a display panel and a backlight element, the display panel is divided into a plurality of display subareas, the backlight element includes a plurality of backlight subareas, the display subareas and the backlight subareas are in a one-to-one correspondence, the method includes: for each of the backlight subareas, calculating an initial backlight value of the backlight subarea according to pixel information of the display subarea corresponding to the backlight subarea; and determining a first correction backlight value of the backlight subarea according to a
(Continued)

preset backlight threshold and an initial backlight value of each of the other backlight subareas adjacent to the backlight subarea.

12 Claims, 6 Drawing Sheets

(56) References Cited

U.S. PATENT DOCUMENTS

| | | | | |
|---|---|---|---|---|
| 2021/0217370 | A1* | 7/2021 | Sun | G09G 3/3426 |
| 2021/0335290 | A1 | 10/2021 | Shi et al. | |

FOREIGN PATENT DOCUMENTS

| | | | | | |
|---|---|---|---|---|---|
| CN | 102117600 | A | | 7/2011 | |
| CN | 106531088 | A | | 3/2017 | |
| CN | 108470548 | A | | 8/2018 | |
| CN | 106328071 | B | * | 9/2018 | G09G 3/342 |
| CN | 109064979 | A | * | 12/2018 | G09G 3/3406 |
| CN | 109448638 | A | | 3/2019 | |
| CN | 109599068 | A | * | 4/2019 | G02B 27/017 |
| CN | 109599068 | A | | 4/2019 | |
| CN | 109686321 | A | | 4/2019 | |
| CN | 109686321 | A | * | 4/2019 | G09G 3/342 |
| CN | 109767733 | A | | 5/2019 | |
| CN | 110246466 | A | | 9/2019 | |
| CN | 110379379 | A | | 10/2019 | |
| CN | 110910840 | A | * | 3/2020 | |
| CN | 110910840 | A | | 3/2020 | |
| CN | 111599320 | A | | 8/2020 | |

* cited by examiner

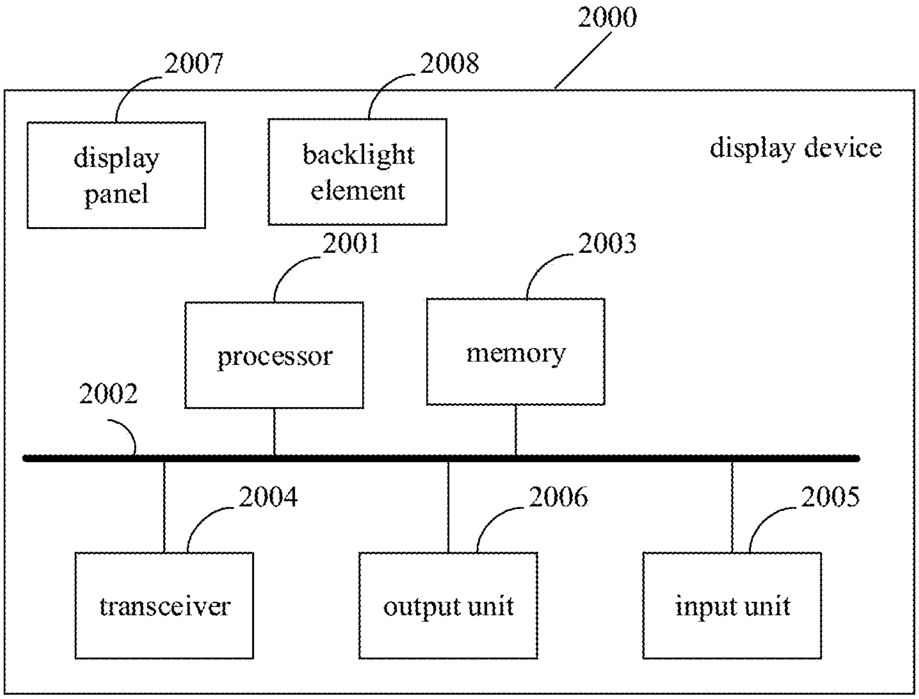
Fig.8
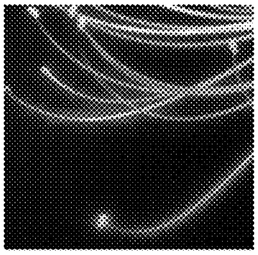
Fig.9 ( a )
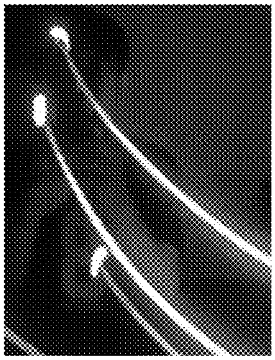
Fig.9 ( b )

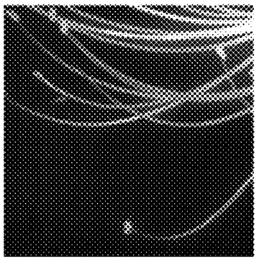
Fig.10 ( a )
Fig.10 ( b )
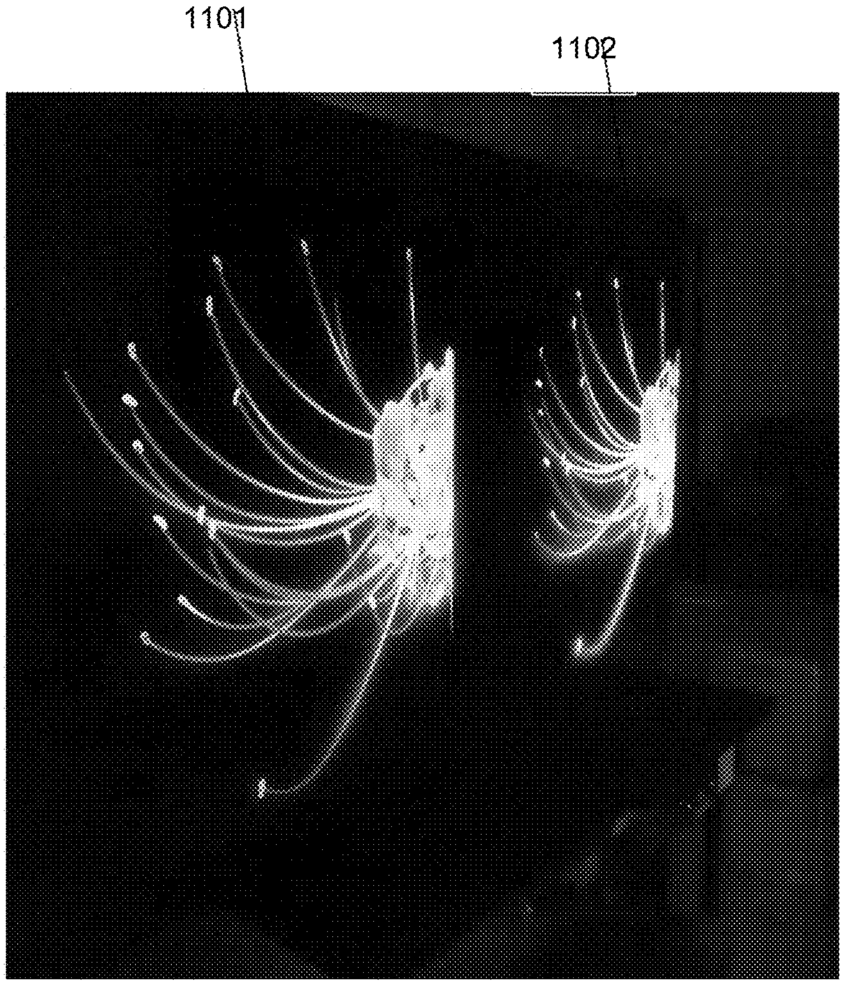
Fig.11

BACKLIGHT ADJUSTING METHOD OF DISPLAY DEVICE, BACKLIGHT ADJUSTING DEVICE AND DISPLAY DEVICE

CROSS-REFERENCE TO RELATED APPLICATION

This application is the U.S. national phase of PCT Application PCT/CN2021/100537 filed on Jun. 17, 2021, which claims priority to Chinese Patent Application No. 202010573243.X filed in China on Jun. 22, 2020, the entire contents of which are hereby incorporated by reference.

TECHNICAL FIELD

The present disclosure relates to the field of display, and in particular to a backlight adjusting method of display device, a backlight adjusting device and a display device.

BACKGROUND

So-called Local Dimming, i.e. backlight area adjustment technique for displays. The backlight composed of hundreds of LEDs is used for replacing CCFL backlight lamps, the backlight LEDs can be adjusted according to the brightness of images, the brightness of a highlight part in a display screen image can be maximized, and meanwhile, the brightness of a dark part can be reduced or even turned off, so that the optimal contrast is achieved. Thus, the reduction in the brightness of the dark area reduces the power consumption of the backlight. In a broad sense, Local Dimming can be roughly divided into three major categories, namely 0D, 1D and 2D Dimming, where 2D Dimming can bring the Local Dimming technique into full play.

SUMMARY

A backlight adjusting method of a display device is provided in the present disclosure, where the display device includes a display panel and a backlight element, the display panel is divided into a plurality of display subareas, the backlight element includes a plurality of backlight subareas, the display subareas and the backlight subareas are in a one-to-one correspondence, the method includes:

for each of the backlight subareas, calculating an initial backlight value of the backlight subarea according to pixel information of the display subarea corresponding to the backlight subarea; and determining a first correction backlight value of the backlight subarea according to a preset backlight threshold and an initial backlight value of each of the other backlight subareas adjacent to the backlight subarea.

Optionally, the preset backlight threshold includes a first preset backlight threshold and a second preset backlight threshold, and the determining the first correction backlight value of the backlight subarea according to the preset backlight threshold and the initial backlight value of another backlight subarea adjacent to the backlight subarea includes:

determining a quantity of initial backlight values of all the other backlight subareas adjacent to the backlight subarea being greater than the second preset backlight threshold, determining a type of the backlight subarea according to the quantity, where the type of the backlight subarea include an isolated halo backlight subarea and a non-isolated halo backlight subarea; and determining the first correction backlight value of the backlight subarea, according to the first preset backlight threshold, the quantity, the type of the backlight subarea and the initial backlight values of a plurality of the backlight subareas adjacent to the backlight subarea.

Optionally, the determining the first correction backlight value of the backlight subarea, according to the first preset backlight threshold, the quantity, the type of the backlight subarea and the initial backlight values of a plurality of the backlight subareas adjacent to the backlight subarea includes:

determining the first correction backlight values of the backlight subareas according to the first preset backlight threshold, the quantity and the type of the backlight subareas through the following formula:

$$L_{coor} = \begin{cases} L_{avg}, & L_{min} \geq th1 \text{ or } L_{min} \geq L_{avg} \\ \max\left[L_{min},\ L_{avg} * \left(k + (1-k) * \frac{L_{min}}{th1}\right)\right], & L_{min} < th1 \text{ and } L_{min} < L_{avg} \end{cases}$$

$L_{coor}$ is the first correction backlight value of the backlight subarea, $L_{avg}$ is the initial backlight value of the backlight subarea, $L_{min}$ is a minimum initial backlight value among initial backlight values of all backlight subareas adjacent to the backlight subarea, th1 is the first preset backlight threshold, and k is a value determined according to the type of the backlight subarea, and $k \in (0, 1)$.

Optionally, the method further includes:

performing a flicker suppression processing on the first correction backlight value to obtain a second correction backlight value of the backlight subarea; and performing a backlight driving on the backlight subarea according to the second correction backlight value.

Optionally, the performing the flicker suppression processing on the first correction backlight value to obtain the second correction backlight value of the backlight subarea includes:

performing the flicker suppression processing on the first correction backlight value to obtain the second correction backlight value of the backlight subarea through the following formula:

$$L_{out} = m * L_{forlight} + (1-m) L_{newlight}$$

$L_{out}$ is the second correction backlight value of the backlight subarea when display a current frame of image;

$L_{forlight}$ is the second correction backlight value of the backlight subarea when display a previous frame of image;

$L_{newlight}$ is the first correction backlight value of the backlight subarea when display a current frame of image;

m is a coefficient, $m \in (0, 1)$.

Optionally, the method further includes:

determining a maximum pixel value among all pixels within each display subarea;

determining a minimum backlight threshold required for preventing pixels in each display subarea from compensation overflow, according to the maximum pixel value of each display subarea and a preset gamma curve;

calculating a backlight compensation value of each backlight subarea, according to the first correction backlight value of each backlight subarea and the minimum backlight threshold corresponding to each backlight subarea, to obtain a backlight compensation matrix corresponding to all the backlight subareas; and compensating the pixels of the display subarea corresponding to each backlight subarea, according to the backlight compensation matrix and the second correction backlight value of each backlight subarea.

Optionally, the calculating the backlight compensation value of each backlight subarea according to the first correction backlight value of each backlight subarea and the minimum backlight threshold corresponding to each backlight subarea to obtain the backlight compensation matrix corresponding to all the backlight subareas includes:

for each backlight subarea, when the first correction backlight value of the backlight subarea is smaller than the corresponding minimum backlight threshold of the backlight subarea, calculating a difference value between the first correction backlight value of the backlight subarea and the corresponding minimum backlight threshold of the backlight subarea to, obtain the backlight compensation value of the backlight subarea; and determining backlight compensation values corresponding to a plurality of backlight subareas around the backlight subarea, according to the backlight compensation value of the backlight subarea.

Optionally, the compensating the pixels of the display subarea corresponding to each backlight subarea according to the backlight compensation matrix and the second correction backlight value of each backlight subarea includes:

superposing the backlight compensation matrix and the second correction backlight value of each backlight subarea when displaying the current frame of image to obtain a backlight numerical value matrix corresponding to all the backlight subareas;

determining a pixel compensation value of each display subarea according to the backlight numerical value matrix; and compensating the pixels of each display subarea according to the pixel compensation value of each display subarea.

Optionally, the determining the pixel compensation value of each display subarea according to the backlight numerical value matrix includes:

performing a convolution calculation on a point spread function of a light source of the backlight subarea and the backlight numerical matrix to obtain backlight brightness information corresponding to each pixel in each display subarea; and compensating the pixels of each display subarea according to the backlight brightness information.

Optionally, the pixel includes a plurality of sub-pixels, a maximum value of brightness values of the plurality of sub-pixels represents a brightness value of the pixels, and the pixel information in the display subarea includes an average value of brightness values of all pixels in the display subarea.

A backlight adjusting device of a display device is provided in the present disclosure, where the display device includes a display panel and a backlight element, the display panel is divided into a plurality of display subareas, the backlight element includes a plurality of backlight subareas, the display subareas and the backlight subareas are in a one-to-one correspondence, the backlight adjusting device includes:

an initial backlight value calculation module, configured to, for each of the backlight subareas, calculate an initial backlight value of the backlight subarea according to pixel information of the display subarea corresponding to the backlight subarea; and a correction module, configured to determine a first correction backlight value of the backlight subarea according to a preset backlight threshold and an initial backlight value of each of the other backlight subareas adjacent to the backlight subarea.

A display device is provided in the present disclosure, including the backlight adjusting device hereinabove.

A display device is provided in the present disclosure, including a display panel and a backlight element, the display panel is divided into a plurality of display subareas, the backlight element includes a plurality of backlight subareas, the display subareas and the backlight subareas are in a one-to-one correspondence, the display device further includes:

a processor;

a memory electrically connected with the processor;

at least one program stored in the memory and configured to be executed by the processor, the at least one program is executed by the processor to perform the backlight adjusting method hereinabove.

BRIEF DESCRIPTION OF THE DRAWINGS

FIG. 8 is a schematic structural diagram of a display device according to an embodiment of the disclosure;

FIGS. 9(*a*) and 9(*b*) are diagrams illustrating effects obtained by processing using the Local Dimming algorithm in the related art;

FIGS. 10(*a*) and 10(*b*) are diagrams of effects obtained after processing using the backlight adjusting method in the embodiment of the present disclosure; and FIG. 11 is a comparison diagram of an effect diagram obtained after processing through a Local Dimming algorithm in the related art and an effect diagram obtained after processing through the backlight adjusting method in the embodiment of the present disclosure.

DETAILED DESCRIPTION

Figure 1:
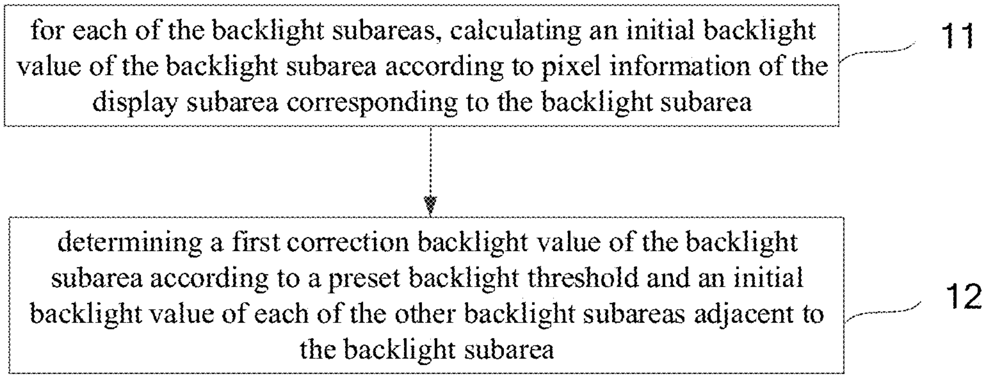
FIG. 1 is a schematic flowchart of a backlight adjusting method of a display device according to an embodiment of the disclosure.

To make the objects, technical solutions and advantages of the embodiments of the present disclosure more apparent, the technical solutions of the embodiments of the present disclosure will be described clearly and completely below with reference to the drawings of the embodiments of the present disclosure. It is to be understood that the described embodiments are only a few embodiments of the present disclosure, and not all embodiments. All other embodiments, which can be derived from the description of the embodiments of the disclosure by a person skilled in the art, are intended to be within the scope of the disclosure.

The backlight source used by the display in the related art is the whole area light source, when the brightness is adjusted, the whole picture can become bright or dark at the same time, and the Local Dimming uses the backlight composed of hundreds of LEDs to replace the backlight in the related art. By designing a corresponding algorithm, the backlight LED can be adjusted according to the brightness of the image, so that the contrast of the image is improved, and the energy consumption can be reduced.

With the continuous progress of the process, the size of the LED device is smaller and smaller, the quantity of dynamic subareas of a screen backlight source formed by the LED device is also greater, and the local Dimming device in the related art is limited by too small number of subareas, so that the halo phenomenon is not additionally processed, or the contrast ratio is reduced by only increasing the backlight in a dark area, so that the halo phenomenon exists in a display picture, and the problem of pixel compensation overflow occurs, which causes some detailed information to be lost, and reduces the picture display effect. For the Local Dimming display device with high subarea, which is composed of small-sized LEDs and dynamic backlight, the technical advantages should be fully exerted, and the display effect is further improved.

Currently, the basic area backlight adjustment algorithm mainly includes three parts: calculation of backlight brightness, actual backlight simulation and liquid crystal pixel compensation. The research shows that the algorithm in the related art mainly focuses on reducing the energy consumption of the backlight source, and a particular method focuses on improving the contrast of the final display image, but for the display equipment of the LED backlight source with smaller size, the quantity of the subareas is higher, the backlight area of the whole picture is divided more finely, the displayed brightness and contrast are excellent, but an obvious halo, namely a halo phenomenon, exists at the light and dark boundary of the picture due to the light leakage of the liquid crystal. Meanwhile, since local Dimming itself is that different pixels in the same subarea correspond to the same backlight value, the problem of compensation overflow can be caused inevitably in pixel compensation based on backlight brightness, so that some detail information is lost, and the viewing effect is influenced.

Please refer to FIG. 1, which is a flowchart illustrating a backlight adjusting method of a display device according to an embodiment of the disclosure. As shown in FIG. 1, in a backlight adjusting method of a display device provided in an embodiment of the present disclosure, the display device includes a display panel and a backlight element, where the backlight element includes a plurality of backlight subareas, the display panel is also divided into a plurality of display subareas, and the display subareas and the backlight subareas are arranged in a one-to-one correspondence manner, the method may include the following steps:

Step 11: for each of the backlight subareas, calculating an initial backlight value of the backlight subarea according to pixel information of the display subarea corresponding to the backlight subarea.

In this step, since one display subarea corresponds to one backlight subarea, the initial backlight value of the backlight subarea corresponding to the pixel information in each display subarea can be calculated by obtaining the pixel information in each display subarea. In some embodiments, each pixel may include a plurality of sub-pixels, such as R, G, B sub-pixels, a maximum of the brightness values of the plurality of sub-pixels representing the brightness value of the pixel, and the pixel information within the display subarea includes an average of the brightness values of all the pixels within the display subarea. In the embodiment of the present disclosure, an average value method is adopted, that is, an average value of brightness values of all pixels in a display subarea is used as an initial backlight value of a corresponding backlight subarea.

Step 12: determining a first correction backlight value of the backlight subarea according to a preset backlight threshold and an initial backlight value of each of the other backlight subareas adjacent to the backlight subarea.

In the embodiment of the present disclosure, step 11 and step 12 are performed for each backlight subarea, and the backlight subarea in which step 11 and step 12 are being performed may be referred to as a current backlight subarea.

The halo phenomenon is mainly expressed in that a circle of obvious halo appears in an area which is supposed to be dark around a highlight image, and based on the characteristic of high subarea of an LED backlight source, the most effective method is to weaken the backlight brightness of a peripheral halo highlight area or an isolated dotted line-shaped highlight halo area without interfering with an area without the halo phenomenon. However, in practical tests, it is found that not all halo subareas are suitable for suppression, for example, after the edge of a large area of pure color highlight subarea is subjected to halo suppression to reduce the backlight brightness, an obvious edge darkening phenomenon occurs, and the visual effect is adversely affected. Therefore, in the embodiment of the present disclosure, a preset backlight threshold is set, and then the initial backlight value of each backlight subarea is corrected according to the preset backlight threshold and the initial backlight value of the backlight subarea adjacent to each backlight subarea, so as to obtain a first correction backlight value corresponding to each backlight subarea. The isolated backlight subareas which are judged to be easy to generate the halo phenomenon can be greatly inhibited, the non-isolated backlight subareas cannot be processed, and the original backlight data can still be kept, so that the halo phenomenon is reduced to the maximum extent, and the optimal display effect is kept.

In an embodiment of the disclosure, the preset backlight threshold includes a first preset backlight threshold and a second preset backlight threshold, and the determining the first correction backlight value of the backlight subarea according to the preset backlight threshold and the initial backlight value of another backlight subarea adjacent to the backlight subarea includes:

determining a quantity of initial backlight values of all the other backlight subareas adjacent to the backlight subarea being greater than the second preset backlight threshold, determining a type of the backlight subarea according to the quantity, where the type of the backlight subarea include an isolated halo backlight subarea and a non-isolated halo backlight subarea; and determining the first correction backlight value of the backlight subarea, according to the first preset backlight threshold, the quantity, the type of the backlight subarea and the initial backlight values of a plurality of the backlight subareas adjacent to the backlight subarea.

Specifically, when halo suppression is performed, first, two judgment thresholds, namely a first preset backlight threshold and a second preset backlight threshold, are set, and then, for a current backlight subarea, a backlight value of a backlight subarea adjacent to the current backlight subarea, that is, an initial backlight value of a backlight subarea adjacent to a target backlight subarea, is obtained. Generally, since the backlight subareas are distributed in an array, the quantity of the backlight subareas adjacent to the target backlight subarea is eight, the quantity of the initial backlight values in the eight adjacent backlight subareas which are greater than the second preset backlight threshold is recorded, and according to the quantity, the type of the target backlight subarea, namely, the type of the target backlight subarea belongs to the isolated halo backlight subarea or the non-isolated halo backlight subarea can be determined. The isolated halo backlight subareas are isolated backlight subareas which are easy to generate a halo phenomenon; the non-isolated halo backlight subareas are backlight subareas which are easy to generate halo phenomena but belong to the edges of large-area highlight areas instead of being isolated. Therefore, different correction processing modes are carried out on the initial backlight value of the target backlight subarea according to the type of the target backlight subarea to obtain the first correction backlight value of the current backlight subarea, and the problem of display effect reduction caused by large-amplitude suppression on all backlight subareas is solved.

In this embodiment of the disclosure, the determining the first correction backlight value of the backlight subarea, according to the first preset backlight threshold, the quantity, the type of the backlight subarea and the initial backlight values of a plurality of the backlight subareas adjacent to the backlight subarea includes:

determining the first correction backlight values of the backlight subareas according to the first preset backlight threshold, the quantity and the type of the backlight subareas through the following formula:

$$L_{coor} = \begin{cases} L_{avg}, & L_{min} \geq th1 \text{ or } L_{min} \geq L_{avg} \\ \max\left[L_{min}, L_{avg} * \left(k + (1-k) * \frac{L_{min}}{th1}\right)\right], & L_{min} < th1 \text{ and } L_{min} < L_{avg} \end{cases}$$

$L_{coor}$ is the first correction backlight value of the backlight subarea, $L_{avg}$ is the initial backlight value of the backlight subarea, $L_{min}$ is a minimum initial backlight value among initial backlight values of all backlight subareas adjacent to the backlight subarea, th1 is the first preset backlight threshold, and k is a value determined according to the type of the backlight subarea, and $k \in (0, 1)$.

That is, after the type of the current backlight subarea is determined, the value obtained by k in the above formula is determined, and the value falls within the range of 0 to 1, so that the first correction backlight value of the current backlight subarea can be calculated by substituting different values of k into the formula.

Figure 2:
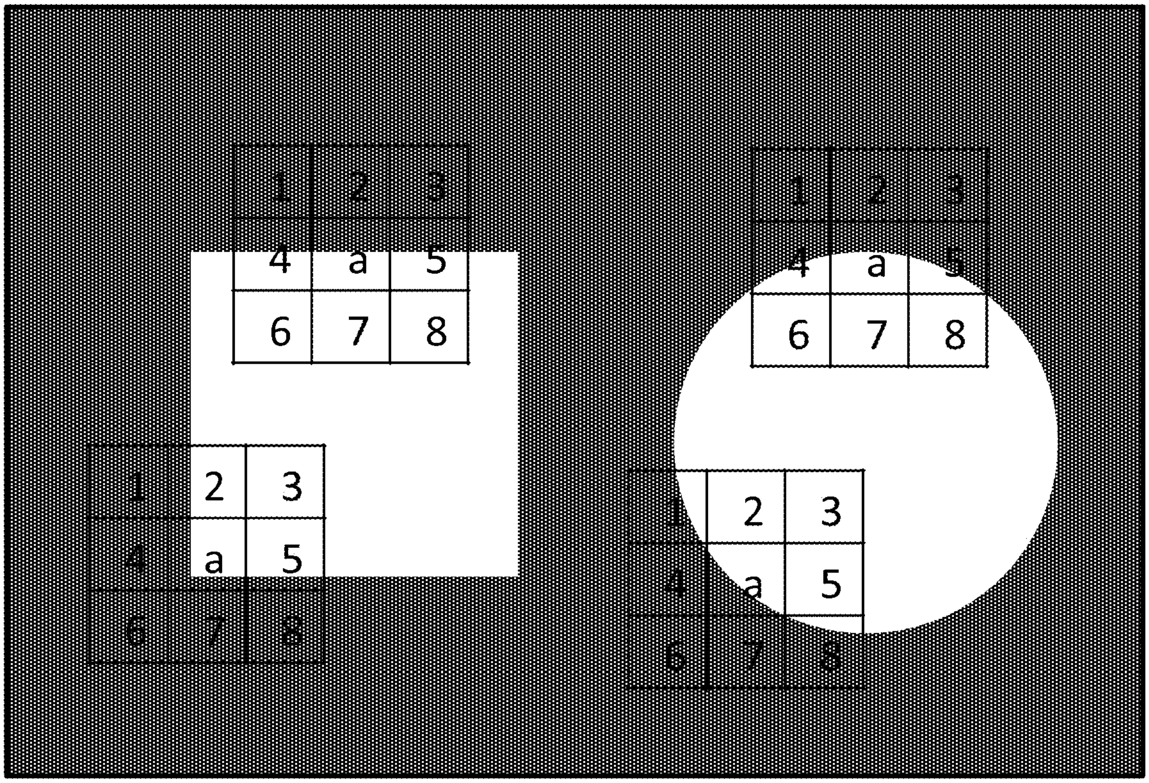
FIG. 2 is a schematic diagram of a backlight subarea provided by the embodiment of the present disclosure at an edge position of a large-area highlight area.
Figure 3:
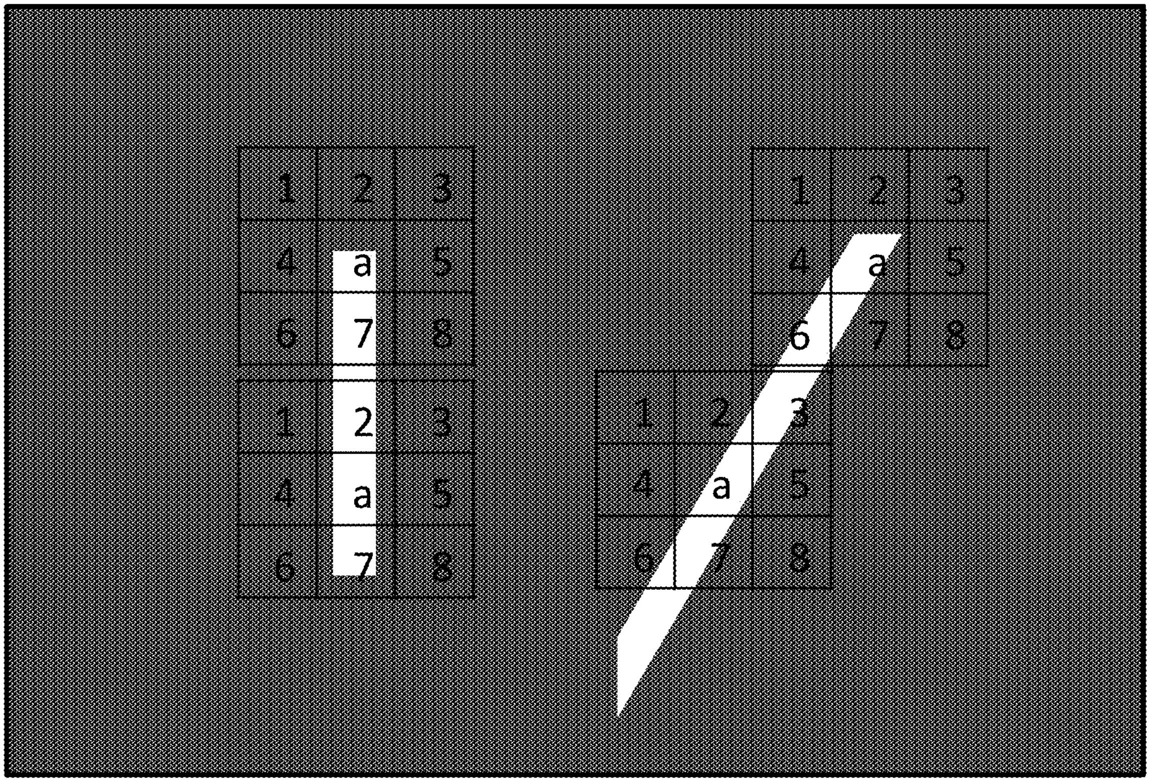
FIG. 3 is a schematic diagram of a backlight subarea in an isolated area prone to halo generation according to an embodiment of the disclosure.

Referring to FIG. 2 and FIG. 3, FIG. 2 is a schematic diagram of a current backlight subarea provided by an embodiment of the present disclosure being located at an edge position of a large-area highlight area, and FIG. 3 is a schematic diagram of a current backlight subarea provided by an embodiment of the present disclosure being located in an isolated area prone to halo. As shown in FIGS. 2 and 3, analyzing the quantity of the initial backlight values greater than the second preset backlight threshold in the eight backlight subareas adjacent to the current backlight subarea in two cases, it can be found that the quantity of the initial backlight values greater than the second preset backlight threshold in the eight backlight subareas adjacent to the current backlight subarea a in FIG. 2 is greater than 3, and the quantity of the initial backlight values greater than the second preset backlight threshold in the eight backlight subareas adjacent to the current backlight subarea a in FIG. 3 is less than 3, so that the types of the backlight subareas can be distinguished by taking 3 as a boundary value. Namely, the backlight subareas belong to non-isolated halo backlight subareas when the quantity of the initial backlight values in the eight backlight subareas adjacent to the backlight subarea, which are greater than the second preset backlight threshold, is greater than 3, and the backlight subareas belong to isolated halo backlight subareas when the quantity of the initial backlight values in the eight backlight subareas adjacent to the backlight subarea, which are greater than the second preset backlight threshold, is less than 3, so that the value of k in the formula is determined according to the types of the backlight subareas.

In the embodiment of the present disclosure, k is a backlight compression coefficient, the smaller the value is, the darker the compressed backlight is, and the larger the value is, the brighter the compressed backlight is. In an alternative embodiment, according to the experimental test result, the value of k is selected as follows:

$$k = \begin{cases} 0.8, & num \geq 3 \\ 0.3, & num < 3 \end{cases}$$

num is the quantity of the initial backlight values in the eight backlight subareas adjacent to the backlight subarea which are larger than a second preset backlight threshold.

That is to say, when num is less than 3, if the current backlight subarea is judged to be an isolated backlight subarea which is easy to generate the halo phenomenon, k is greatly compressed by taking a smaller numerical value (0.3) to reduce the halo phenomenon; when num is more than or equal to 3, judging that the current backlight subarea is a backlight subarea which is easy to generate a halo phenomenon, but belongs to the edge of a large-area highlight area and is not suitable for large-amplitude compression processing, and taking a larger numerical value (0.8) for k, so that the halo phenomenon is slightly reduced and the problem of too dark edge is avoided; when the value selection mode is adopted for value taking, a better correction effect can be obtained.

The first preset backlight threshold, that is, the backlight compression algorithm trigger threshold, takes a magnitude relationship between the first preset backlight threshold and the initial backlight value of the backlight subarea adjacent to the backlight subarea as a segmentation condition of the formula (which may be regarded as a segmentation function), so that under the condition of $L_{min} \geq th1$ or $L_{min} \geq L_{avg}$, the initial backlight value of the backlight subarea is taken as the first correction backlight value of the backlight subarea, that is, the backlight subarea is not prone to halo, and then compression suppression processing is not performed on the initial backlight value of the backlight subarea, and the original backlight data is maintained, so as to maintain the optimal display effect. Under the condition of $L_{min}$<th1 and $L_{min}$<$L_{avg}$, the initial backlight value of the backlight subarea is corrected by adopting the formula, namely the backlight subarea is a backlight subarea which is easy to generate a halo phenomenon, and the value of k is further determined according to the type of the backlight subarea to inhibit the backlight subarea, so that the halo phenomenon is reduced to the maximum extent. Here, each backlight subarea of the backlight element is corrected through the above formula, and the first correction backlight values of all backlight subareas can be obtained, thereby achieving the reduction of the halo phenomenon to the maximum extent and simultaneously maintaining the best display effect.

In an optional embodiment, the value range of the first preset backlight threshold is 0-255, and through experimental tests, a better correction display effect can be obtained when the value is 128. The value range of the second preset backlight threshold is 128-255, and through experimental tests, a better correction display effect can be obtained when the value is 200.

In the embodiment of the present disclosure, the backlight adjusting method further includes:

performing a flicker suppression processing on the first correction backlight value to obtain a second correction backlight value of the backlight subarea; and performing a backlight driving on the backlight subarea according to the second correction backlight value.

In the working process of the display device, most of the displayed pictures are dynamic images and videos, so the backlight numerical values of all backlight subareas are changed in real time along with the change of picture contents, which results in that the same backlight subarea may belong to the backlight subarea in which the halo phenomenon occurs when the previous frame of image is displayed, and does not belong to the backlight subarea in which the halo phenomenon occurs when the next frame of image is displayed, so the numerical values obtained after the change between the two frames is processed by an algorithm are relatively different, the backlight numerical values are greatly jumped, and finally the flicker phenomenon is generated, which is also a negative effect brought by the halo suppression. Therefore, it is necessary to perform flicker suppression processing on the first correction backlight value to obtain a second correction backlight value, and then perform backlight driving on the target backlight subarea according to the second correction backlight value.

In this embodiment of the disclosure, the performing the flicker suppression processing on the first correction backlight value to obtain the second correction backlight value of the backlight subarea includes:

performing the flicker suppression processing on the first correction backlight value to obtain the second correction backlight value of the backlight subarea through the following formula:

$$L_{out}=m*L_{forlight}+(1-m)L_{newlight}$$

$L_{out}$ is the second correction backlight value of the backlight subarea when display a current frame of image;

$L_{forlight}$ is the second correction backlight value of the backlight subarea when display a previous frame of image;

$L_{newlight}$ is the first correction backlight value of the backlight subarea when display a current frame of image;

m is a coefficient, m∈(0, 1).

That is to say, the second correction backlight value of the backlight subarea when the current frame image is displayed is weighted and summed through the second correction backlight value of the backlight subarea when the previous frame image is displayed and the first correction backlight value of the backlight subarea when the current frame image is displayed, so as to balance the backlight values of the upper and lower frames and prevent large-amplitude change. The coefficient of m is 0-1, if the value of m is large, a backlight delay feeling can be generated, if the value of m is too small, the effect of flicker suppression cannot be achieved, and through practical tests, a good flicker suppression effect can be obtained when the value of m is 0.65. And finally, driving the backlight component to correspondingly emit light according to the second correction backlight values of all the backlight subareas.

In the embodiment of the present disclosure, the backlight adjusting method further includes:

determining a maximum pixel value among all pixels within each display subarea;

determining a minimum backlight threshold required for preventing pixels in each display subarea from compensation overflow, according to the maximum pixel value of each display subarea and a preset gamma curve;

calculating a backlight compensation value of each backlight subarea, according to the first correction backlight value of each backlight subarea and the minimum backlight threshold corresponding to each backlight subarea, to obtain a backlight compensation matrix corresponding to all the backlight subareas; and compensating the pixels of the display subarea corresponding to each backlight subarea, according to the backlight compensation matrix and the second correction backlight value of each backlight subarea.

In some embodiments, the pixel value may be a brightness value of the pixel.

In the related art, no special processing is performed specifically for the compensation overflow area, and in order to make the finally displayed image satisfy the gamma curve, the original image pixel information of each pixel in each display subarea needs to be calculated according to the backlight value of the corresponding backlight subarea, so as to obtain the pixel value under the corresponding backlight value. Because the pixels of the same display subarea correspond to the backlight numerical values of a single backlight subarea, an overflow truncation phenomenon occurs after part of pixels are subjected to calculation processing, and the details of a displayed image are lost, and the phenomenon generally exists in local Dimming equipment. Therefore, in order to ensure the display effect of the display device, pixels for compensating overflow need to be suppressed so as to keep more image detail information as much as possible.

Specifically, firstly, the maximum pixel value of all the pixels in each display subarea is counted, and then the backlight value when all the pixels in the display subarea are compensated and overflow does not happen right, that is, the minimum backlight threshold, is reversely deduced according to the maximum pixel value of each display subarea and a preset gamma curve, and can be specifically calculated by adopting the following formula:

$$L_{th}=255*\left(\frac{V_{max}}{L_{max}}\right)^{2.2}$$

in the formula, $V_{max}$ is the maximum pixel value in all pixels in the display subarea, $L_{max}$ is the maximum backlight value that can be reached by the corresponding backlight subarea are usually 255, $L_{th}$ is the minimum backlight threshold at which no overflow occurs when all pixels in the display subarea are compensated, and 2.2 in the formula is the gamma value corresponding to the preset gamma curve, and the value also changes correspondingly according to different preset gamma curves, for example, the value may also be 2.0.

When the above formula is actually applied to calculation, since the quantity of pixels in one display subarea is large, the value of $V_{max}$ can be properly reduced, and the value of $L_{max}$ can be properly increased, and it is not necessary to consider the situation that each pixel does not generate compensation overflow.

In this embodiment of the disclosure, the calculating the backlight compensation value of each backlight subarea according to the first correction backlight value of each backlight subarea and the minimum backlight threshold corresponding to each backlight subarea to obtain the backlight compensation matrix corresponding to all the backlight subareas includes:

for each backlight subarea, when the first correction backlight value of the backlight subarea is smaller than the corresponding minimum backlight threshold of the backlight subarea, calculating a difference value between the first correction backlight value of the backlight subarea and the corresponding minimum backlight threshold of the backlight subarea to, obtain the backlight compensation value of the backlight subarea; and determining backlight compensation values corresponding to a plurality of backlight subareas around the backlight subarea, according to the backlight compensation value of the backlight subarea.

Specifically, an initial backlight compensation matrix with all zero initial values may be constructed, and then, for each backlight subarea, the first correction backlight value of the backlight subarea is compared with the minimum backlight threshold corresponding to the backlight subarea, if the first correction backlight value of the backlight subarea is smaller than the minimum backlight threshold, it means that overflow occurs during pixel compensation of the display subarea corresponding to the backlight subarea, and therefore, a difference between the first correction backlight value of the backlight subarea and the minimum backlight threshold corresponding to the backlight subarea needs to be calculated, where the difference is a corresponding backlight compensation value, and the difference is recorded in a corresponding position of the initial backlight compensation matrix to replace the original value (i.e., zero is replaced). And executing the steps for each backlight subarea, thereby obtaining a backlight compensation matrix formed by the backlight compensation values corresponding to all the backlight subareas.

Figure 4:
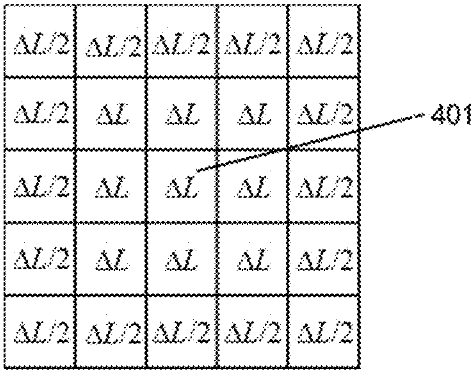
FIG. 4 is a schematic diagram of assigning values to a plurality of backlight subareas around a current backlight subarea according to an embodiment of the present disclosure.

Referring to FIG. 4, a schematic diagram of assigning values to a plurality of backlight subareas around a current backlight subarea according to an embodiment of the disclosure is shown. In order to ensure that the backlight brightness of the adjacent backlight subarea is not changed greatly, the backlight compensation values of the plurality of backlight subareas adjacent to the current backlight subarea need to be assigned according to the backlight compensation value of the current backlight subarea. As shown in FIG. 4, in the assignment, assuming that the backlight compensation value of the current backlight subarea is $\Delta L$, the backlight compensation value is gradually decreased toward the surrounding backlight subareas by taking the current backlight subarea as the center to assign the backlight compensation value to the surrounding backlight subareas, so as to obtain a smooth transition result of the backlight brightness, for example, the first circle of the backlight subarea at the periphery of the current backlight subarea 401 is also assigned with $\Delta L$, and the second circle of the backlight subarea at the periphery is assigned with $\Delta L/2$. And performing the steps of calculating the difference values and assigning values on all the backlight subareas to obtain a backlight compensation matrix formed by the backlight compensation values of all the backlight subareas.

In an embodiment of the disclosure, he compensating the pixels of the display subarea corresponding to each backlight subarea according to the backlight compensation matrix and the second correction backlight value of each backlight subarea includes:

superposing the backlight compensation matrix and the second correction backlight value of each backlight subarea when displaying the current frame of image to obtain a backlight numerical value matrix corresponding to all the backlight subareas;

determining a pixel compensation value of each display subarea according to the backlight numerical value matrix; and compensating the pixels of each display subarea according to the pixel compensation value of each display subarea.

Specifically, after a backlight compensation matrix formed by the backlight compensation values of all the backlight subareas is obtained, the backlight compensation matrix is superposed with the second correction backlight value of each backlight subarea when the current frame picture is displayed, that is, the second correction backlight value of each backlight subarea is superposed with the corresponding backlight compensation value in the backlight compensation matrix to obtain a backlight numerical value matrix corresponding to all the backlight subareas; then, according to the backlight numerical value matrix, the pixel compensation value of the display subarea corresponding to each backlight subarea can be determined, and finally, the pixel of each display subarea is compensated.

In an embodiment of the present disclosure, the determining the pixel compensation value of each display subarea according to the backlight numerical value matrix includes:

performing a convolution calculation on a point spread function of a light source of the backlight subarea and the backlight numerical matrix to obtain backlight brightness information corresponding to each pixel in each display subarea; and compensating the pixels of each display subarea according to the backlight brightness information.

The method includes the steps of firstly, performing convolution calculation on a Point Spread Function (PSF) obtained by actually measuring a backlight light source used in a backlight subarea and a backlight numerical value matrix to obtain smooth backlight brightness information consistent with the resolution of an original input image, namely obtaining the backlight brightness information corresponding to each image pixel point in each display subarea, and performing corresponding compensation on pixels of an original image according to the backlight brightness information, so that better display effect can be obtained by matching the output backlight brightness. The pixel compensation can be calculated using the following formula:

$$Y_{i,j}' = \left(\frac{BL_{full}}{BL_{i,j}'}\right)^{1/2.2} \times Y_{i,j}$$

$BL_{full}$ is the brightness of the backlight subarea when being fully bright generally corresponds to 255, and $BL_{i,j}'$ is a backlight brightness value obtained after convolution calculation, and $Y_{i,j}$ and $Y_{i,j}'$ are a pixel values before compensation and a pixel value after compensation respectively.

Figure 5:
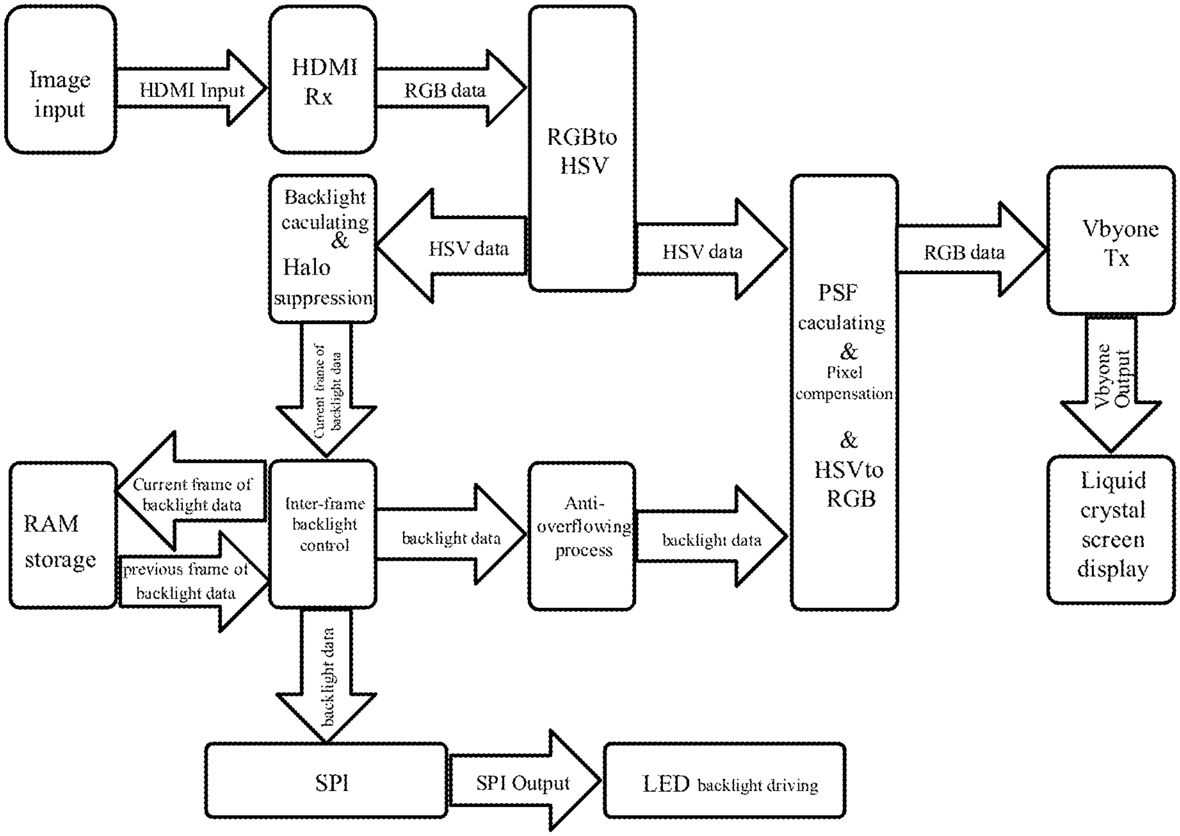
FIG. 5 is a schematic view illustrating an FPGA implementation flow of a backlight adjusting method according to an embodiment of the present disclosure.

Please refer to FIG. 5, which is a schematic flowchart illustrating an implementation process of a Field Programmable Gate Array (FPGA) of the backlight adjusting method according to an embodiment of the disclosure. As shown in FIG. 5, after the image data is input through the HDMI interface, it is first required to convert the RGB color space into HSV (Hue, Saturation) color space, where the brightness V is the maximum Value of RGB three channels, and the subsequent algorithm processing is also mainly calculated according to the brightness Value V. After the image data is converted into HSV data, the following two processes are mainly performed. One part is a backlight control part, and the other part is an image display part. For the backlight control part, after image data is converted into HSV data, initial backlight value calculation and halo suppression processing are required to be carried out, the initial backlight value is obtained by performing mean value calculation mainly according to the brightness value of pixels in the display subarea corresponding to each backlight subarea, and the halo suppression processing is to correct the initial backlight value by adopting the correction formula for calculating the first correction backlight value so as to suppress halo. The backlight data of the current frame obtained after halo suppression processing needs to be further subjected to interframe backlight control, namely, the flicker suppression processing avoids the phenomenon of flicker caused by large-amplitude jump of backlight values. The backlight data of the previous frame provided by the RAM memory is needed in the flicker suppression process, and the detailed steps of the flicker suppression process are the same as above, and are not described herein again. Backlight data obtained after the inter-frame backlight control is transmitted to a backlight driving board through an SPI (Serial Peripheral Interface), so that the light emission of a backlight source (LED) is controlled. For the image display part, the backlight data obtained after flicker suppression processing (interframe backlight control) is further subjected to overflow prevention processing so as to avoid image detail loss caused by compensation overflow of pixels in the corresponding display subarea under the current backlight value. And performing convolution calculation on the backlight data obtained by the anti-overflow processing and a Point Spread Function (PSF) of a backlight light source used by the backlight subarea, compensating pixels in the display subarea according to a convolution calculation result to obtain pixel data of each compensated display subarea, converting the pixel data of each compensated display subarea back to an RGB color space again to obtain RGB data, and driving the liquid crystal screen to display images.

The halo problem is mainly due to the light leakage characteristics of the liquid crystal, most pronounced in the side view case, which is slightly less visible than the side view but also has been shown to affect the viewing experience. The halo area is reduced on a high backlight zone (i.e., a higher number of backlight zones) local dimming device compared to a low zone device but still significant. After the backlight adjusting method is adopted for adjustment, the halo problem is basically solved within 30 degrees of a front view angle, and the halo phenomenon is greatly reduced although the halo problem cannot be completely eliminated under the side view condition of more than 30 degrees. Meanwhile, for the compensation overflow problem commonly existing in the local dimming algorithm, the embodiment of the disclosure effectively inhibits the overflow problem, and further improves the display effect.

FIGS. 9(*a*) and 9(*b*) respectively show the actual verification effect on the TV with 8 k 10000 subareas through the Local Dimming algorithm in the related art, the shooting angle is a positive viewing angle, and it can be seen that even though the quantity of backlight subareas of the device is high, a very obvious halo phenomenon still exists under the Local Dimming algorithm in the related art, especially for the thin line pattern. After the scheme of the present disclosure is replaced (as shown in FIGS. 10(*a*) and 10(*b*)), it can be obviously seen that the halo phenomenon basically disappears, the advantage of high backlight subarea number is exerted, and the viewing effect is greatly improved.

FIG. 11 is a result of photographing in the case where the side view angle is greater than 30 degree. 1101 is an effect diagram obtained by the backlight adjusting method of the present disclosure, and 1102 is an effect diagram obtained by processing a Local Dimming algorithm in the related art. It can be seen that in the edge pistil subarea where halo is most likely to occur, the halo phenomenon of the backlight adjusting method treatment results of the present disclosure is greatly suppressed. The two algorithm processing results of the flower center subarea without halo phenomenon are not different, which shows that the backlight adjusting method can accurately find the halo subarea and correct the halo subarea, but does not interfere with other subareas.

By adopting the backlight adjusting method, the high contrast effect of Local Dimming can be realized, and meanwhile, compared with a Local Dimming algorithm in the related technology, the problems of halo phenomenon and detail loss caused by compensation overflow are greatly inhibited, the advantage of high backlight subarea number is exerted, and the viewing effect is greatly improved.

In a word, according to the backlight adjusting method of the embodiment of the disclosure, under the condition that the overall display brightness and contrast are not affected, the halo problem of the local dimming device and the local detail loss problem caused by compensation overflow can be well weakened, and the picture effect is improved.

Figure 6:
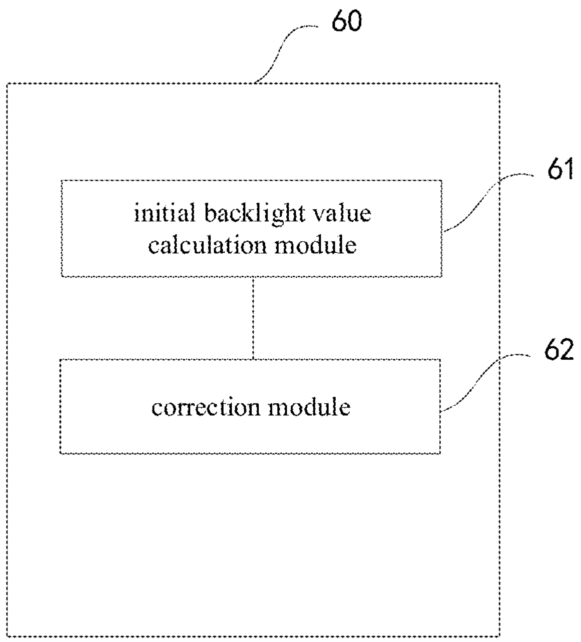
FIG. 6 is a schematic structural diagram of a backlight adjusting device of a display device according to an embodiment of the present disclosure.

FIG. 6 is a schematic structural diagram of a backlight adjustment device of a display device according to an embodiment of the disclosure. As shown in FIG. 6, another embodiment of the present disclosure further provides a backlight adjusting device of a display device, which is an apparatus corresponding to the above method embodiment, the display device includes a display panel and a backlight element, the display panel is divided into a plurality of display subareas, the backlight element includes a plurality of backlight subareas, the display subareas and the backlight subareas are in a one-to-one correspondence, the backlight adjusting device 60 includes:

an initial backlight value calculation module 61, configured to, for each of the backlight subareas, calculate an initial backlight value of the backlight subarea according to pixel information of the display subarea corresponding to the backlight subarea; and a correction module 62, configured to determine a first correction backlight value of the backlight subarea according to a preset backlight threshold and an initial backlight value of each of the other backlight subareas adjacent to the backlight subarea.

According to the backlight adjusting device disclosed by the embodiment of the disclosure, under the condition that the overall display brightness and contrast are not influenced, the halo problem of local dimming equipment and the local detail loss problem caused by compensation overflow can be well weakened, and the picture effect is improved.

Optionally, the preset backlight threshold includes a first preset backlight threshold and a second preset backlight threshold, and the correction module includes:

a type determining unit, configured to determine a quantity of initial backlight values of all the other backlight subareas adjacent to the backlight subarea being greater than the second preset backlight threshold, determine a type of the backlight subarea according to the quantity, where the type of the backlight subarea include an isolated halo backlight subarea and a non-isolated halo backlight subarea;

a correction unit, configured to determine the first correction backlight value of the backlight subarea, according to the first preset backlight threshold, the quantity, the type of the backlight subarea and the initial backlight values of a plurality of the backlight subareas adjacent to the backlight subarea.

Optionally, the correcting unit is configured to determine the first correction backlight values of the backlight subareas according to the first preset backlight threshold, the quantity and the type of the backlight subareas through the following formula:

$$L_{coor}=\begin{cases} L_{avg}, & L_{min}\ge th1 \text{ or } L_{min}\ge L_{avg} \\ \max\left[L_{min},\ L_{avg}*\left(k+(1-k)*\frac{L_{min}}{th1}\right)\right], & L_{min}<th1 \text{ and } L_{min}<L_{avg} \end{cases}$$

$L_{coor}$ is the first correction backlight value of the backlight subarea, $L_{avg}$ is the initial backlight value of the backlight subarea, $L_{min}$ is a minimum initial backlight value among initial backlight values of all backlight subareas adjacent to the backlight subarea, th1 is the first preset backlight threshold, and k is a value determined according to the type of the backlight subarea, and k∈(0, 1).

Optionally, the device further includes:

a flicker suppression module, configured to perform a flicker suppression processing on the first correction backlight value to obtain a second correction backlight value of the backlight subarea;

a backlight driving module, configured to perform a backlight driving on the backlight subarea according to the second correction backlight value.

Optionally, the flicker suppressing module is configured to perform the flicker suppression processing on the first correction backlight value to obtain the second correction backlight value of the backlight subarea through the following formula:

$$L_{out}=m*L_{forlight}+(1-m)L_{newlight}$$

$L_{out}$ is the second correction backlight value of the backlight subarea when display a current frame of image;

$L_{forlight}$ is the second correction backlight value of the backlight subarea when display a previous frame of image;

$L_{newlight}$ is the first correction backlight value of the backlight subarea when display a current frame of image;

m is a coefficient, m∈(0, 1).

Optionally, the method further includes:

a first determining module, configured to determine a maximum pixel value among all pixels within each display subarea;

a second determining module, configured to determine a minimum backlight threshold required for preventing pixels in each display subarea from compensation overflow, according to the maximum pixel value of each display subarea and a preset gamma curve;

a calculation module, configured to calculate a backlight compensation value of each backlight subarea, according to the first correction backlight value of each backlight subarea and the minimum backlight threshold corresponding to each backlight subarea, to obtain a backlight compensation matrix corresponding to all the backlight subareas; and a compensation module, configured to compensate the pixels of the display subarea corresponding to each backlight subarea, according to the backlight compensation matrix and the second correction backlight value of each backlight subarea.

Optionally, the device further comprises:

a difference value calculating unit, configured to, for each backlight subarea, when the first correction backlight value of the backlight subarea is smaller than the corresponding minimum backlight threshold of the backlight subarea, calculate a difference value between the first correction backlight value of the backlight subarea and the corresponding minimum backlight threshold of the backlight subarea to, obtain the backlight compensation value of the backlight subarea;

an assignment unit, configured to determine backlight compensation values corresponding to a plurality of backlight subareas around the backlight subarea, according to the backlight compensation value of the backlight subarea.

Optionally, the compensation module includes:

a superposition unit, configured to superpose the backlight compensation matrix and the second correction backlight value of each backlight subarea when displaying the current frame of image to obtain a backlight numerical value matrix corresponding to all the backlight subareas;

a pixel compensation value, configured to determine a pixel compensation value of each display subarea according to the backlight numerical value matrix; and a pixel compensation unit, configured to compensate the pixels of each display subarea according to the pixel compensation value of each display subarea.

Optionally, the pixel compensation value determining unit includes:

a convolution calculation subunit, configured to perform a convolution calculation on a point spread function of a light source of the backlight subarea and the backlight numerical matrix to obtain backlight brightness information corresponding to each pixel in each display subarea;

a pixel compensation subunit, configured to compensate the pixels of each display subarea according to the backlight brightness information.

Figure 7:
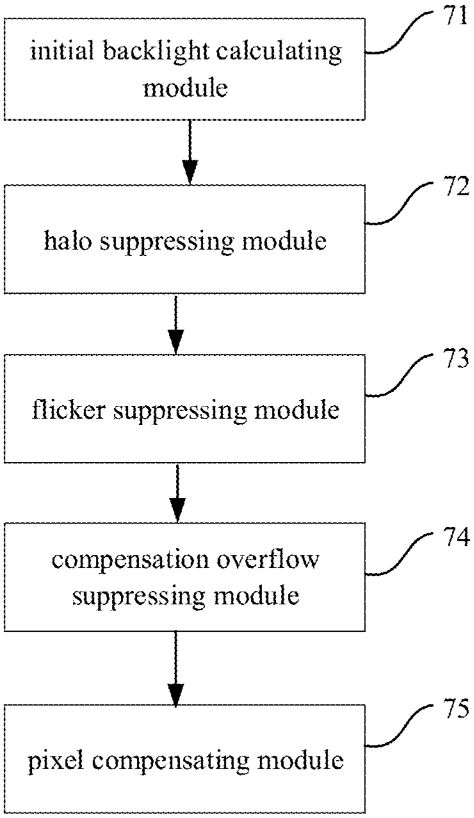
FIG. 7 is a second schematic structural diagram of a backlight adjusting device of a display device according to a second embodiment of the disclosure.

FIG. 7 is a second schematic structural diagram of a backlight adjustment device of a display device according to a second embodiment of the disclosure. As shown in FIG. 7, the backlight adjusting device mainly includes an initial backlight calculating module 71, a halo suppressing module 72, a flicker suppressing module 73, a compensation overflow suppressing module 74, and a pixel compensating module 75. The initial backlight calculating module 71 is mainly configured to calculate an initial backlight value of each backlight subarea; the halo suppressing module 72 is configured to modify the initial backlight value of each backlight subarea according to a preset backlight threshold and the initial backlight value of the backlight subarea adjacent to each backlight subarea, so as to suppress a halo phenomenon of the backlight subarea; the flicker suppression module 73 mainly adopts a time domain IIR filter to perform flicker suppression processing on the first correction backlight value of each backlight subarea obtained by the halo suppression module, so as to avoid the problem of picture flicker caused by large-amplitude jump of the backlight value; the compensation overflow suppression module 74 is mainly configured to suppress pixel compensation overflow according to the second backlight value of the backlight subarea obtained by the processing of the flicker suppression module, so as to avoid a compensation overflow phenomenon occurring in pixels of the display subarea; the pixel compensation module 75 is mainly configured to compensate the pixels of the display subarea according to the backlight numerical matrix that is processed by the compensation overflow suppression module and does not overflow.

Meanwhile, the function module used by the backlight adjusting device in the embodiment of the disclosure can flexibly adjust the hardware condition of the visual equipment. If the quantity of device backlight subareas is sufficiently high, for example, a 75 inch 10000 subareaed display panel has substantially no significant backlight flicker after using a halo suppression module compared to a 75 inch 5000 subareaed display panel, and thus, the backlight flicker suppression module 73 may be masked and have fewer pixel overflow subareas. Theoretically, if the quantity of backlight subareas is large enough and the area of a single backlight subarea is small enough, the pixel overflow problem can be avoided, and the overflow compensation suppression module 74 can be shielded.

The backlight adjusting device in the embodiment of the disclosure greatly inhibits halo phenomenon while keeping image contrast, and simultaneously reduces detail loss easily caused by a Local Dimming method in the related art.

In another aspect of the present disclosure, an embodiment of the present disclosure further provides a display device, where the display device includes the backlight adjusting device described in the above embodiment, and since the backlight adjusting device in the above embodiment has the beneficial effects that the halo problem existing in the local dimming device can be well weakened and the local detail loss problem caused by overflow compensation can be well reduced without affecting the overall display brightness and contrast, and the picture effect is improved.

The present disclosure provides in an alternative embodiment a display device, as shown in FIG. 8, the display device 2000 shown in FIG. 8 including: a processor 2001 and a memory 2003. The processor 2001 and memory 2003 are electrically coupled, such as via bus 2002, among other things.

Processor 2001 may be a CPU (Central Processing Unit), general purpose Processor, DSP (Digital Signal Processor), ASIC (Application Specific Integrated Circuit), FPGA (Field Programmable Gate Array), or other Programmable logic device, transistor logic, hardware component, or any combination thereof. Which may implement or execute the various illustrative logical blocks, modules, and circuits described in connection with the disclosure. The processor 2001 may also be a combination of computing functions, e.g., including one or more microprocessors, DSPs and microprocessors, and the like.

Bus 2002 may include a path that conveys information between the aforementioned components. The bus 2002 may be a PCI (Peripheral Component Interconnect) bus, an EISA (Extended Industry Standard Architecture) bus, or the like. The bus 2002 may be divided into an address bus, a data bus, a control bus, and so on. For ease of illustration, only one thick line is shown in FIG. 7, but that does not indicate only one bus or one type of bus.

The Memory 2003 may be a ROM (Read-Only Memory) or other type of static storage device that can store static information and instructions, a RAM (random access Memory) or other type of dynamic storage device that can store information and instructions, an EEPROM (Electrically Erasable Programmable Read-Only Memory), a CD-ROM (Compact disk Read-Only Memory) or other optical disk storage, optical disk storage (including Compact disk, laser disk, optical disk, digital versatile disk, Blu-ray disk, etc.), a magnetic disk storage medium or other magnetic storage device, or any other medium that can be used to carry or store desired program code in the form of instructions or data structures and that can be accessed by a computer, but is not limited to such.

Optionally, the display device 2000 may also include a transceiver 2004. The transceiver 2004 may be used for reception and transmission of signals. The transceiver 2004 may allow the display device 2000 to communicate with other devices wirelessly or by wire to exchange data. It should be noted that the transceiver 2004 is not limited to one in practice.

Optionally, the display device 2000 may further include an input unit 2005. The input unit 2005 may be used to receive input numeric, character, image and/or sound information, or to generate key signal inputs related to user settings and function control of the display device 2000. The input unit 2005 may include, but is not limited to, one or more of a touch screen, a physical keyboard, function keys (such as volume control keys, switch keys, etc.), a trackball, a mouse, a joystick, a camera, a microphone, and the like.

Optionally, the display device 2000 may further include an output unit 2006. Output unit 2006 may be used to output or show information processed by processor 2001. The output unit 2006 may include, but is not limited to, one or more of a display device, a speaker, a vibration device, and the like.

The display device 2000 may further include a display panel 2007 and a backlight element 2008, the display panel 2007 being divided into a plurality of display subareas, and the backlight element 2008 including a plurality of backlight subareas, the display subareas and the backlight subareas being in one-to-one correspondence.

While FIG. 8 illustrates a display device 2000 having various means, it is to be understood that not all illustrated means are required to be implemented or provided. More or fewer devices may be alternatively implemented or provided.

Optionally, the memory 2003 is used to store at least one program for performing the disclosed aspects and is controlled in execution by the processor 2001. The processor 2001 is configured to execute at least one program stored in the memory 2003 to implement any one of the backlight adjusting methods provided by the embodiments of the present disclosure.

It should be noted that the division of each module is only a logical division, and all or part of the actual implementation may be integrated into one physical entity or may be physically separated. And these modules can all be implemented in the form of software invoked by a processing element; or can be implemented in the form of hardware; and part of the modules can be realized in the form of calling software by the processing element, and part of the modules can be realized in the form of hardware. For example, the determining module may be a processing element separately set up, or may be integrated into a chip of the apparatus, or may be stored in a memory of the apparatus in the form of program code, and a processing element of the apparatus calls and executes the function of the determining module. The other modules are implemented similarly. In addition, all or part of the modules can be integrated together or can be independently realized. The processing element described herein may be an integrated circuit having signal processing capabilities. In implementation, each step of the above method or each module above may be implemented by an integrated logic circuit of hardware in a processor element or an instruction in the form of software.

For example, the various modules, units, sub-units or sub-modules may be one or more integrated circuits configured to implement the above methods, such as: one or more Application Specific Integrated Circuits (ASICs), or one or more microprocessors (DSPs), or one or more Field Programmable Gate Arrays (FPGAs), among others. For another example, when some of the above modules are implemented in the form of a Processing element scheduler code, the Processing element may be a general-purpose processor, such as a Central Processing Unit (CPU) or other processor that can call the program code. As another example, these modules may be integrated together and implemented in the form of a system-on-a-chip (SOC).

The terms "first," "second," and the like in the description and in the claims of the present disclosure are used for distinguishing between similar elements and not necessarily for describing a particular sequential or chronological order. It is to be understood that the data so used may be interchanged under appropriate circumstances such that embodiments of the disclosure described herein may be implemented, for example, in sequences other than those illustrated or described herein. Moreover, the terms "includes," "including," and "having," and any variations thereof, are intended to cover a non-exclusive inclusion, such that a process, method, system, article, or apparatus that includes a list of steps or elements is not necessarily limited to those steps or elements expressly listed, but may include other steps or elements not expressly listed or inherent to such process, method, article, or apparatus. Further, the use of "and/or" in the specification and claims means that at least one of the connected objects, such as a and/or B and/or C, means that 7 cases are included that include a alone, B alone, C alone, and both a and B, B and C, a and C, and A, B and C. Similarly, the use of "at least one of A and B" in the specification and claims is to be understood as "A alone, B alone, or both A and B present".

While certain embodiments of the present disclosure have been described, it will be understood by those skilled in the art that various changes and modifications may be made without departing from the spirit and scope of the disclosure, and such changes and modifications are to be considered within the scope of the disclosure.

What is claimed is:

1. A backlight adjusting method of a display device, wherein the display device comprises a display panel and a backlight element, the display panel is divided into a plurality of display subareas, the backlight element comprises a plurality of backlight subareas, the display subareas and the backlight subareas are in a one-to-one correspondence, the method comprises:

for each of the backlight subareas, calculating an initial backlight value of the backlight subarea according to pixel information of the display subarea corresponding to the backlight subarea; and determining a first correction backlight value of the backlight subarea according to a preset backlight threshold and an initial backlight value of each of the other backlight subareas adjacent to the backlight subarea;

wherein the preset backlight threshold comprises a first preset backlight threshold and a second preset backlight threshold, and the determining the first correction backlight value of the backlight subarea according to the preset backlight threshold and the initial backlight value of another backlight subarea adjacent to the backlight subarea comprises:

determining a quantity of initial backlight values of all the other backlight subareas adjacent to the backlight subarea being greater than the second preset backlight threshold, determining a type of the backlight subarea according to the quantity, wherein the type of the backlight subarea comprise an isolated halo backlight subarea and a non-isolated halo backlight subarea; and determining the first correction backlight value of the backlight subarea, according to the first preset backlight threshold, the quantity, the type of the backlight subarea and the initial backlight values of a plurality of the backlight subareas adjacent to the backlight subarea.

2. The backlight adjusting method according to claim 1, wherein the determining the first correction backlight value of the backlight subarea, according to the first preset backlight threshold, the quantity, the type of the backlight subarea and the initial backlight values of a plurality of the backlight subareas adjacent to the backlight subarea comprises:

determining the first correction backlight values of the backlight subareas according to the first preset backlight threshold, the quantity and the type of the backlight subareas through the following formula:

$$L_{coor} = \begin{cases} L_{avg}, & L_{min} \geq th1 \text{ or } L_{min} \geq L_{avg} \\ \max\left[L_{min}, L_{avg} * \left(k + (1-k) * \frac{L_{min}}{th1}\right)\right], & L_{min} < th1 \text{ and } L_{min} < L_{avg} \end{cases}$$

$L_{coor}$ is the first correction backlight value of the backlight subarea, $L_{avg}$ is the initial backlight value of the backlight subarea, $L_{min}$ is a minimum initial backlight value among initial backlight values of all backlight subareas adjacent to the backlight subarea, th1 is the first preset backlight threshold, and k is a value determined according to the type of the backlight subarea, and $k \in (0, 1)$.

3. The backlight adjusting method according to claim 1, further comprising:

performing a flicker suppression processing on the first correction backlight value to obtain a second correction backlight value of the backlight subarea; and performing a backlight driving on the backlight subarea according to the second correction backlight value.

4. The backlight adjusting method according to claim 3, wherein the performing the flicker suppression processing on the first correction backlight value to obtain the second correction backlight value of the backlight subarea comprises:

performing the flicker suppression processing on the first correction backlight value to obtain the second correction backlight value of the backlight subarea through the following formula:

$$L_{out}=m*L_{forlight}+(1-m)L_{newlight}$$

$L_{out}$ is the second correction backlight value of the backlight subarea when display a current frame of image;

$L_{forlight}$ is the second correction backlight value of the backlight subarea when display a previous frame of image;

$L_{newlight}$ is the first correction backlight value of the backlight subarea when display a current frame of image;

m is a coefficient, $m \in (0, 1)$.

5. The backlight adjusting method according to claim 4, further comprising:

determining a maximum pixel value among all pixels within each display subarea;

determining a minimum backlight threshold required for preventing pixels in each display subarea from compensation overflow, according to the maximum pixel value of each display subarea and a preset gamma curve;

calculating a backlight compensation value of each backlight subarea, according to the first correction backlight value of each backlight subarea and the minimum backlight threshold corresponding to each backlight subarea, to obtain a backlight compensation matrix corresponding to all the backlight subareas; and compensating the pixels of the display subarea corresponding to each backlight subarea, according to the backlight compensation matrix and the second correction backlight value of each backlight subarea.

6. The backlight adjusting method according to claim 5, wherein the calculating the backlight compensation value of each backlight subarea according to the first correction backlight value of each backlight subarea and the minimum backlight threshold corresponding to each backlight subarea to obtain the backlight compensation matrix corresponding to all the backlight subareas comprises:

for each backlight subarea, when the first correction backlight value of the backlight subarea is smaller than the corresponding minimum backlight threshold of the backlight subarea, calculating a difference value between the first correction backlight value of the backlight subarea and the corresponding minimum backlight threshold of the backlight subarea to, obtain the backlight compensation value of the backlight subarea; and determining backlight compensation values corresponding to a plurality of backlight subareas around the backlight subarea, according to the backlight compensation value of the backlight subarea.

7. The backlight adjusting method according to claim 6, wherein the compensating the pixels of the display subarea corresponding to each backlight subarea according to the backlight compensation matrix and the second correction backlight value of each backlight subarea comprises:

superposing the backlight compensation matrix and the second correction backlight value of each backlight subarea when displaying the current frame of image to obtain a backlight numerical value matrix corresponding to all the backlight subareas;

determining a pixel compensation value of each display subarea according to the backlight numerical value matrix; and compensating the pixels of each display subarea according to the pixel compensation value of each display subarea.

8. The backlight adjusting method according to claim 7, wherein the determining the pixel compensation value of each display subarea according to the backlight numerical value matrix comprises:

performing a convolution calculation on a point spread function of a light source of the backlight subarea and the backlight numerical matrix to obtain backlight brightness information corresponding to each pixel in each display subarea; and compensating the pixels of each display subarea according to the backlight brightness information.

9. The backlight adjusting method according to claim 1, wherein the pixel comprises a plurality of sub-pixels, a maximum value of brightness values of the plurality of sub-pixels represents a brightness value of the pixels, and the pixel information in the display subarea comprises an average value of brightness values of all pixels in the display subarea.

10. A display device, comprising a display panel and a backlight element, the display panel is divided into a plurality of display subareas, the backlight element comprises a plurality of backlight subareas, the display subareas and the backlight subareas are in a one-to-one correspondence, the display device further comprises:

a processor;

a memory electrically connected with the processor;

at least one program stored in the memory and configured to be executed by the processor, the at least one program is executed by the processor to perform the backlight adjusting method according to claim 1.

11. A backlight adjusting device of a display device, wherein the display device comprises a display panel and a backlight element, the display panel is divided into a plurality of display subareas, the backlight element comprises a plurality of backlight subareas, the display subareas and the backlight subareas are in a one-to-one correspondence, the backlight adjusting device comprises:

an initial backlight value calculation module, configured to, for each of the backlight subareas, calculate an initial backlight value of the backlight subarea according to pixel information of the display subarea corresponding to the backlight subarea; and a correction module, configured to determine a first correction backlight value of the backlight subarea according to a preset backlight threshold and an initial backlight value of each of the other backlight subareas adjacent to the backlight subarea;

wherein the preset backlight threshold comprises a first preset backlight threshold and a second preset backlight threshold, and the correction module comprises:

a type determining unit, configured to determine a quantity of initial backlight values of all the other backlight subareas adjacent to the backlight subarea being greater than the second preset backlight threshold, determine a type of the backlight subarea according to the quantity, wherein the type of the backlight subarea comprise an isolated halo backlight subarea and a non-isolated halo backlight subarea;

a correction unit, configured to determine the first correction backlight value of the backlight subarea, according to the first preset backlight threshold, the quantity, the type of the backlight subarea and the initial backlight values of a plurality of the backlight subareas adjacent to the backlight subarea.

12. A display device comprising the backlight adjusting device according to claim 11.

* * * * *